United States Patent
Fukuyama et al.

(10) Patent No.: US 10,816,324 B2
(45) Date of Patent: Oct. 27, 2020

(54) CLEARANCE MEASUREMENT DEVICE AND CLEARANCE CONTROL SYSTEM

(71) Applicant: MITSUBISHI HEAVY INDUSTRIES, LTD., Tokyo (JP)

(72) Inventors: Misaki Fukuyama, Tokyo (JP); Akio Kondo, Tokyo (JP); Tomoyuki Onishi, Tokyo (JP); Takahiro Miyamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 93 days.

(21) Appl. No.: 16/313,289

(22) PCT Filed: Aug. 30, 2017

(86) PCT No.: PCT/JP2017/031118
§ 371 (c)(1),
(2) Date: Dec. 26, 2018

(87) PCT Pub. No.: WO2018/043547
PCT Pub. Date: Mar. 8, 2018

(65) Prior Publication Data
US 2020/0182609 A1 Jun. 11, 2020

(30) Foreign Application Priority Data
Aug. 30, 2016 (JP) .................................. 2016-167844

(51) Int. Cl.
*G01B 11/14* (2006.01)
*F01D 25/24* (2006.01)
(52) U.S. Cl.
CPC .............. *G01B 11/14* (2013.01); *F01D 25/24* (2013.01)
(58) Field of Classification Search
CPC ................................. G01B 11/14; F01D 25/24
(Continued)

(56) References Cited

U.S. PATENT DOCUMENTS

| 4,766,323 A | 8/1988 | Franklin et al. |
| 2004/0114154 A1 | 6/2004 | Luetche et al. |
| 2016/0084637 A1 | 3/2016 | John |

FOREIGN PATENT DOCUMENTS

| CN | 103438814 | 12/2013 |
| JP | 11218406 | 8/1999 |

(Continued)

OTHER PUBLICATIONS

International Search Report dated Nov. 28, 2017 in International (PCT) Application No. PCT/JP2017/031118.
(Continued)

*Primary Examiner* — Tri T Ton
(74) *Attorney, Agent, or Firm* — Wenderoth, Lind & Ponack, L.L.P.

(57) ABSTRACT

A clearance measurement device is for measuring a clearance between an inner peripheral surface of a cylindrical casing and an outer peripheral surface of a rotating member configured to rotate in the casing. The clearance measurement device includes a marker provided to the outer peripheral surface; an optical sensor attached to the casing, and configured to emit light toward the outer peripheral surface, receive light reflected from the rotating member, and detect the marker based on a change in amount of the received reflected light; and a measurement controller configured to perform signal processing on signals from the sensor. The sensor includes light reception fibers disposed such that optical axes intersect and having a measurement region on the outer peripheral surface, and planar light sources provided in a row along a rotating direction and each configured to emit light in a manner overlapping with the measurement region.

7 Claims, 12 Drawing Sheets

(58) Field of Classification Search
USPC .................................................. 356/600–640
See application file for complete search history.

(56)         References Cited

FOREIGN PATENT DOCUMENTS

| | | |
|---|---|---|
| JP | 2003-254091 | 9/2003 |
| JP | 2004-191374 | 7/2004 |
| JP | 2015001414 | 1/2015 |

OTHER PUBLICATIONS

Office Action dated Mar. 13, 2020 in corresponding Chinese Patent Application No. 201780039494.6, with English Translation.

CLEARANCE MEASUREMENT DEVICE AND CLEARANCE CONTROL SYSTEM

FIELD

The present invention relates to a clearance measurement device and a clearance control system configured to measure a clearance between a casing formed into a cylindrical shape and a rotating member that rotates in the casing.

BACKGROUND

Conventionally, rotating machines such as an axial compressor having a plurality of turbine blades (rotating members) that rotate in a casing formed into a cylindrical shape have been known (see, for example, Japanese Patent Application Laid-open No. 2003-254091. In this type of rotating machine, a tip clearance sensor configured to measure a tip clearance between the casing and the turbine blade is provided, and the value of the measured tip clearance is kept appropriate. For example, a non-contact sensor such as an optical sensor is used for the tip clearance sensor.

For rotating machines such as axial compressors, steam turbines, and gas turbines, it is significantly important to control a clearance between a casing and a turbine blade (rotating member) in order to obtain appropriate efficiency, and it is required to measure the above-mentioned clearance accurately. Thus, for example, a predetermined marker having reflectivity different from that of an outer peripheral surface (tip surface) of the turbine blade is provided to the outer peripheral surface, and laser light emitted from an optical fiber of an optical sensor is emitted to the outer peripheral surface of the turbine blade to detect that the marker has passed through a predetermined position based on a change in amount of light reflected by the outer peripheral surface. Then, a passage time during which the marker passes through two different predetermined positions is determined from the detection results, and a clearance between the casing and the turbine blade is calculated based on the passage time and a rotation time of the turbine blade.

The conventional configuration, however, has a problem in that laser light emitted from the optical fiber (point light source) may be affected by specular reflection due to roughness on the marker surface to fail in detecting the marker accurately, with the result that an error is caused in a passage time of the marker and the clearance cannot be accurately measured.

It is therefore an object of the present invention to provide a clearance measurement device and a clearance control system capable of suppressing specular reflection on the surface of a marker to reduce a measurement error of a clearance.

SUMMARY OF THE INVENTION

To solve the problem described above and achieve the object, the present invention is a clearance measurement device for measuring a clearance between an inner peripheral surface of a casing having a cylindrical shape and an outer peripheral surface of a rotating member configured to rotate in the casing. The clearance measurement device includes a marker provided to the outer peripheral surface of the rotating member; an optical sensor attached to the casing, and configured to emit light toward the outer peripheral surface of the rotating member, receive light reflected from the rotating member, and detect the marker based on a change in amount of the received reflected light; and a measurement controller configured to perform signal processing on a light emission signal output from the optical sensor and a light reception signal received by the optical sensor. The optical sensor includes light reception fibers disposed such that optical axes intersect at a predetermined angle and having a measurement region on the outer peripheral surface, and planar light sources provided in a row along a rotating direction of the rotating member and each configured to emit light in a manner overlapping with the measurement region.

With this configuration, light is emitted from a planar light source toward a measurement region, and hence a variation in light distribution characteristics can be reduced, and specular reflection on the surface of the marker passing through the measurement region can be suppressed to measure a clearance accurately.

In this configuration, it is preferable that the optical sensor has a light reception opening between the planar light sources, and the optical axes of the light reception fibers intersect on an inner side of the light reception opening. With this configuration, a gap of the light reception fibers can be narrowed to reduce an error caused by thermal elongation.

Further, the planar light sources may each include a light transmission fiber configured to emit excitation light having a predetermined wavelength, and a fluorescent plate configured to emit fluorescence by the excitation light emit from the light transmission fiber. With this configuration, fluorescence is emitted from the entire surface of the fluorescent plate, and hence light can be emitted to a region including a measurement region easily.

In addition, a filter configured to block the excitation light and transmit the fluorescence may be included. With this configuration, the filter blocks excitation light, and hence a malfunction caused by reception of the excitation light can be prevented.

Further, the planar light sources may each include a light transmission fiber configured to emit light, and a scattering plate configured to scatter the light emitted from the light transmission fiber. With this configuration, the scattering plate diffuses light, and hence light can be emitted to a region including the measurement region easily.

Further, the planar light sources may each be formed by bundling light transmission fibers emitting light. With this configuration, the emission area of light emitted from the light transmission fibers can be increased, and hence light can be emitted to a region including the measurement region easily.

Further, a clearance control system according to the present invention includes the clearance measurement device described above; and a turbine controller configured to execute clearance adjustment control for adjusting the clearance based on the clearance measured by the clearance measurement device. With this configuration, the clearance can be accurately measured, and hence the clearance adjustment control by the turbine controller can be precisely executed.

Advantageous Effects of Invention

According to the present invention, light is emitted from each planar light source toward a measurement region, and hence a variation in light distribution characteristics can be reduced, and specular reflection on the surface of the marker passing through the measurement region can be suppressed to measure a clearance accurately.

DETAILED DESCRIPTION OF THE EMBODIMENTS

Embodiments of the present invention are described in detail below with reference to the drawings. Note that the present invention is not limited by the embodiments. Furthermore, components in the following embodiments include those that can be easily replaced by a person skilled in the art or that are substantially equivalent. In addition, the components described below can be combined as appropriate, and when there are a plurality of embodiments, the embodiments can be combined as well.

First Embodiment

Figure 1:
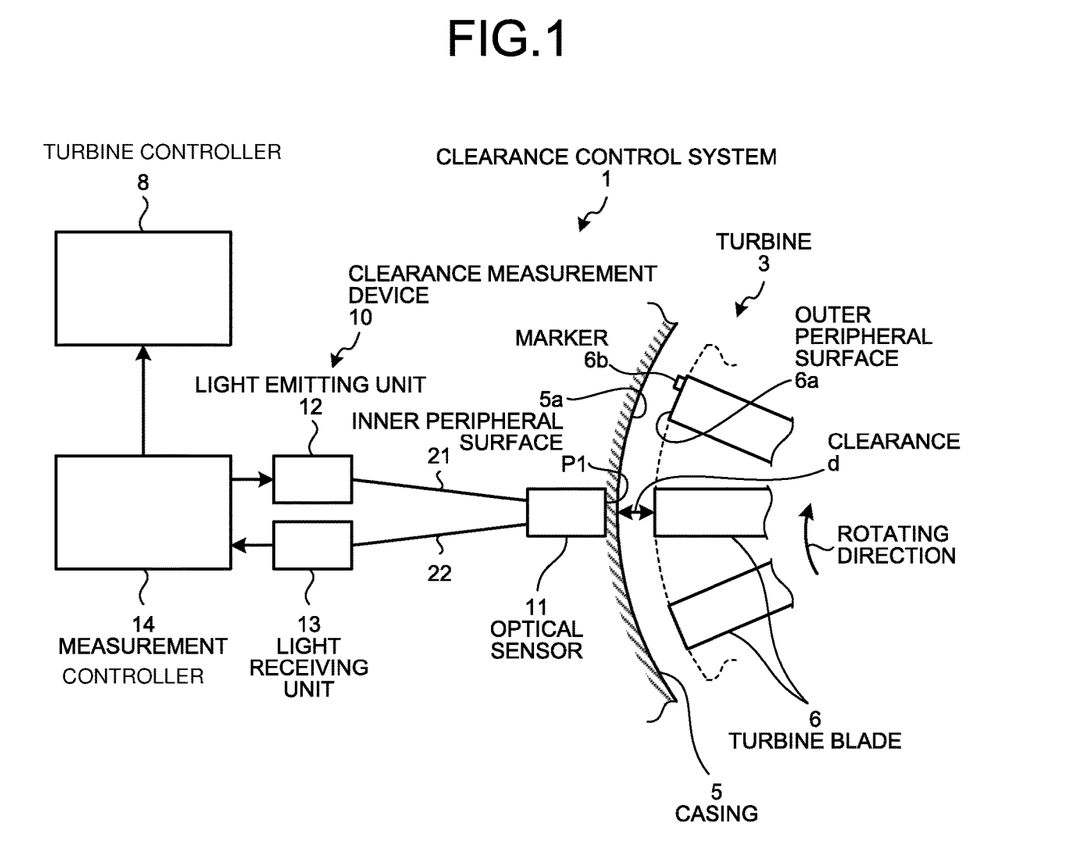
FIG. 1 is a schematic configuration diagram related to a clearance control system according to a first embodiment.

FIG. 1 is a schematic configuration diagram related to a clearance control system according to a first embodiment. As illustrated in FIG. 1, a clearance control system 1 according to the first embodiment is a system configured to measure a clearance d formed between a casing 5 and a turbine blade (rotating member) 6 of a turbine 3 and adjust the clearance d based on measurement results. First, the turbine 3 is described prior to the description of the clearance control system 1.

The turbine 3 is a turbo machine including a steam turbine or a gas turbine. The turbine 3 includes a plurality of turbine blades 6 provided to a rotor (not shown) serving as a rotation shaft, and the casing 5 provided around the turbine blades 6. The turbine blades 6 are mounted to the rotor and provided side by side with predetermined gaps in a circumferential direction of the rotor. The casing 5 is provided to be opposed to the turbine blades 6 provided side by side in the circumferential direction, and is formed into a cylindrical shape. The casing 5 is provided to be opposed to the turbine blades 6 with a predetermined clearance d between an inner peripheral surface 5a of the casing 5 and an outer peripheral surface (tip surface) 6a of the turbine blade 6. For example, the casing 5 includes an inner combustor casing chamber and an outer combustor casing chamber provided on the outer side of the inner combustor casing chamber.

Next, the clearance control system 1 is described with reference to FIG. 1. The clearance control system 1 includes a turbine controller 8 and a clearance measurement device 10. The clearance measurement device 10 measures the clearance d between the inner peripheral surface 5a of the casing 5 and the outer peripheral surface 6a of the turbine blade 6.

The turbine controller 8 executes clearance adjustment control for adjusting the clearance d based on the clearance d measured by the clearance measurement device 10. In this case, the clearance d includes a clearance (what is called a tip clearance) in a radial direction of the rotor and a clearance in an axial direction of the rotor, and FIG. 1 illustrates a clearance d in the radial direction of the rotor.

As clearance adjustment control in the radial direction of the rotor, for example, the turbine controller 8 controls an actuator configured to move the casing 5 including the inner combustor casing chamber and the outer combustor casing chamber vertically, thereby adjusting the clearance d. Furthermore, for example, the turbine controller 8 may control an actuator configured to move the rotor vertically, thereby adjusting the clearance d. Furthermore, for example, the turbine controller 8 may control temperature of the casing 5 to adjust thermal elongation of the casing 5, thereby adjusting the clearance d.

The clearance measurement device 10 measures the clearance d between the casing 5 and the turbine blade 6, and includes an optical sensor 11, a light emitting unit 12, a light receiving unit 13, and a measurement controller 14. As illustrated in FIG. 1, the optical sensor 11 is mounted to the casing 5 and disposed such that a detection surface P1 thereof is opposed to the turbine blade 6 in the radial direction of the rotor. Thus, the optical sensor 11 is exposed to high-temperature and high-pressure outside environments between the casing 5 and the turbine blade 6. The optical sensor 11 includes a plurality of light transmission fibers 21 connected to the light emitting unit 12 and a plurality of light reception fibers 22 connected to the light receiving unit 13.

The light emitting unit 12 emits light toward the outer peripheral surface 6a of the turbine blade 6 through the light transmission fibers 21 based on a light emission signal from the measurement controller 14. The outer peripheral surface 6a of the turbine blade 6 is provided with a marker 6b having reflectivity higher than that of the outer peripheral surface 6a. For example, the markers 6b are disposed on the outer peripheral surface 6a of the turbine blade 6 with a gap in the rotating direction by using heat-resistant paint. Thus, light emitted to the outer peripheral surface 6a is reflected by the marker 6b and enters the detection surface P1 of the optical sensor 11. The light receiving unit 13 receives the reflected light entering from the detection surface P1, and outputs a light reception signal to the measurement controller 14.

The measurement controller 14 is connected to the light emitting unit 12 and the light receiving unit 13, and outputs a light emission signal to the light emitting unit 12 and receives a light reception signal output from the light receiving unit 13. The measurement controller 14 is connected to the turbine controller 8, and performs signal processing on the light emission signal and the light reception signal to measure a clearance d, and outputs the measured clearance d to the turbine controller 8.

Figure 2:
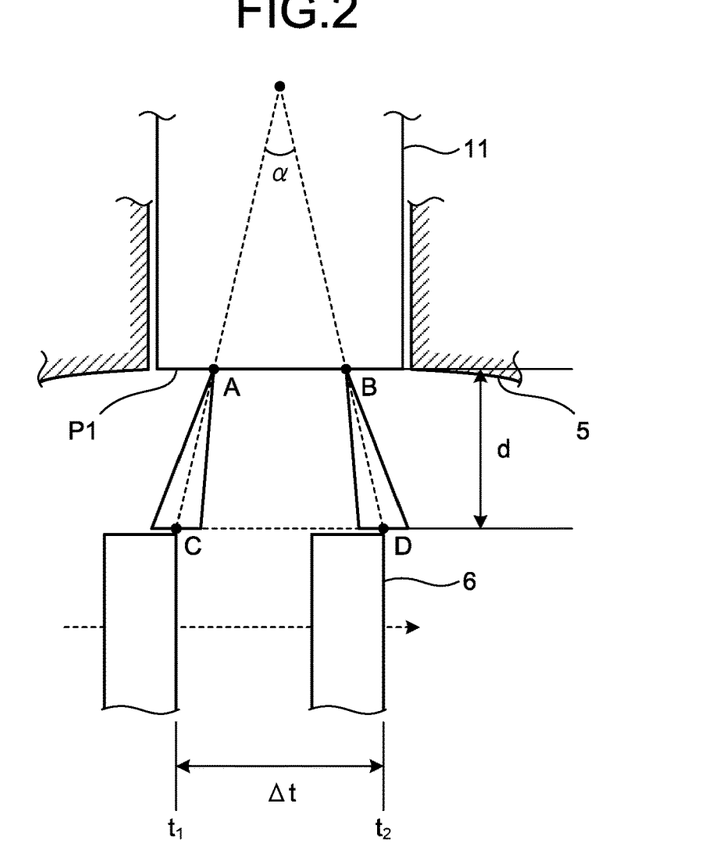
FIG. 2 is an explanatory diagram related to a method for calculating a clearance.
Figure 3:
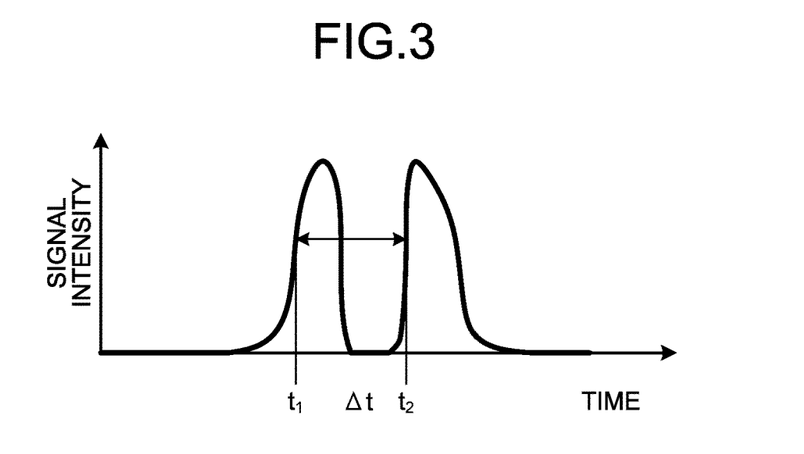
FIG. 3 is a graph related to signal intensity of a light reception signal detected by using an optical sensor.

Next, a general method for calculating the clearance d is described. FIG. 2 is an explanatory diagram related to a method for calculating a clearance. FIG. 3 is a graph related to signal intensity of a light reception signal detected by using the optical sensor. For example, the measurement controller 14 can calculate the clearance d based on a calculation formula expressed by the following Equation (1).

$$d = \frac{\frac{1}{2}\overline{CD}}{\tan\frac{\alpha}{2}} - \frac{\frac{1}{2}\overline{AB}}{\tan\frac{\alpha}{2}} = \frac{\frac{1}{2} \times 2\pi R \times \frac{\Delta t}{T}}{\tan\frac{\alpha}{2}} - \frac{\frac{1}{2}\ell}{\tan\frac{\alpha}{2}} \quad (1)$$

The angle α is an angle formed by light guide directions of two light beams (optical axes) entering two light reception fibers 22. The angle α is a known angle. The distance 1 is the length between A and B, that is, a distance between the two light reception fibers 22, which is a known distance. The perimeter 2πR is a perimeter on the outer circumference of the turbine blades 6, which is a known perimeter. The time T is a time taken for one turn (one rotation), which is obtained based on a rotation speed of the rotor. That is, "2πR/T" is a peripheral velocity of the turbine blades 6 on the outer circumference. The time Δt is a time from when a marker 6b provided on the outer peripheral surface 6a of the turbine blade 6 is detected to when a marker 6b is detected next, which is obtained based on a light reception signal. In this case, the markers 6b may be the same or different.

The measurement controller 14 acquires a light reception signal illustrated in FIG. 3 as the light reception signal. In FIG. 3, the horizontal axis is time, and the vertical axis is signal intensity. As illustrated in FIG. 3, two signal peaks are detected from the light reception signal. For example, the two signal peaks are obtained by a change in reflected light amount when light is emitted to the markers 6b. Then, the measurement controller 14 acquires a time from one signal peak to the other signal peak as the time Δt. After acquiring the time Δt based on the light reception signal, the measurement controller 14 can calculate a clearance d based on the calculation formula expressed by the above Equation (1).

Figure 4:
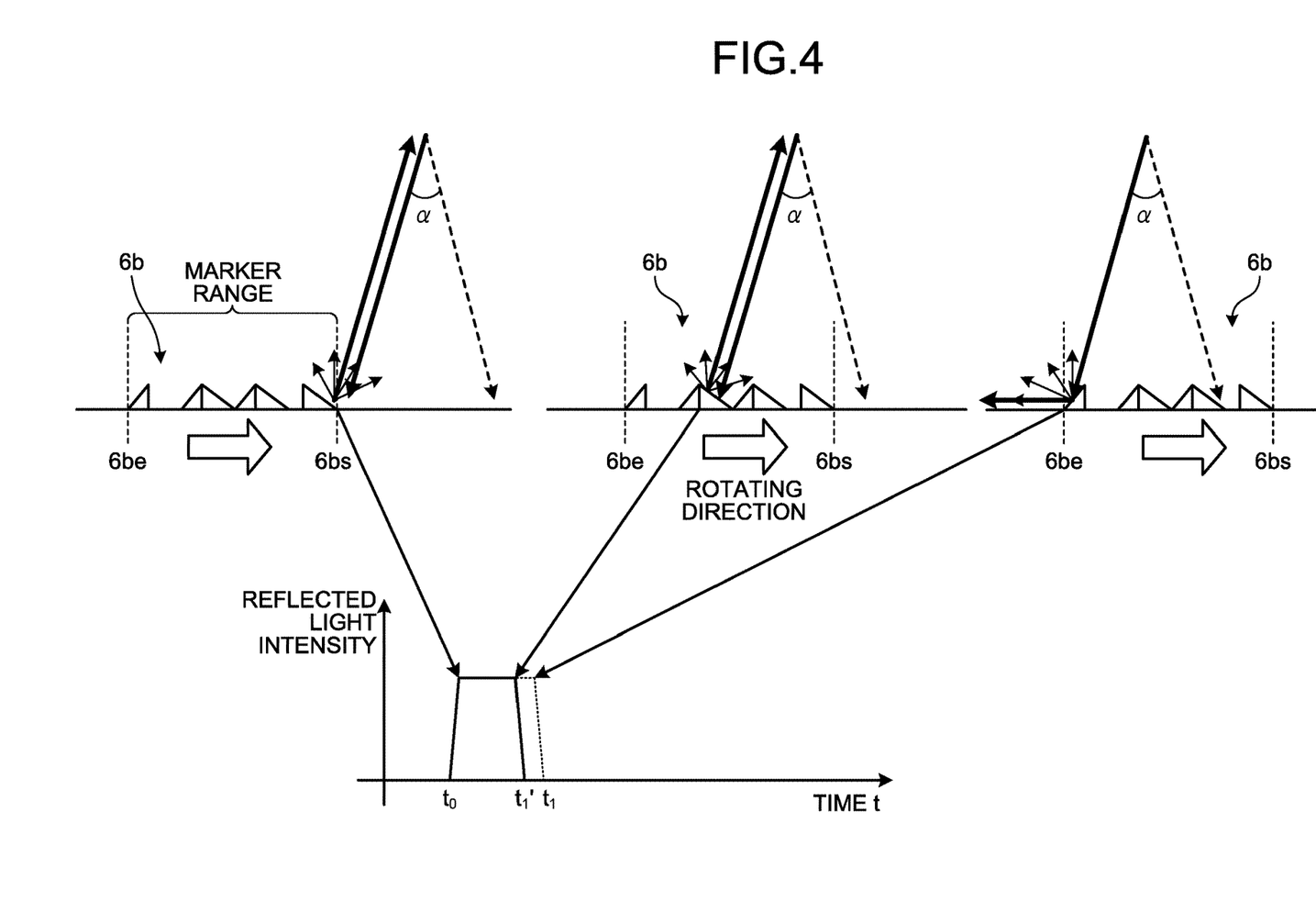
FIG. 4 is a diagram for describing a state in which the surface shape of a marker affects reflected light.
Figure 5:
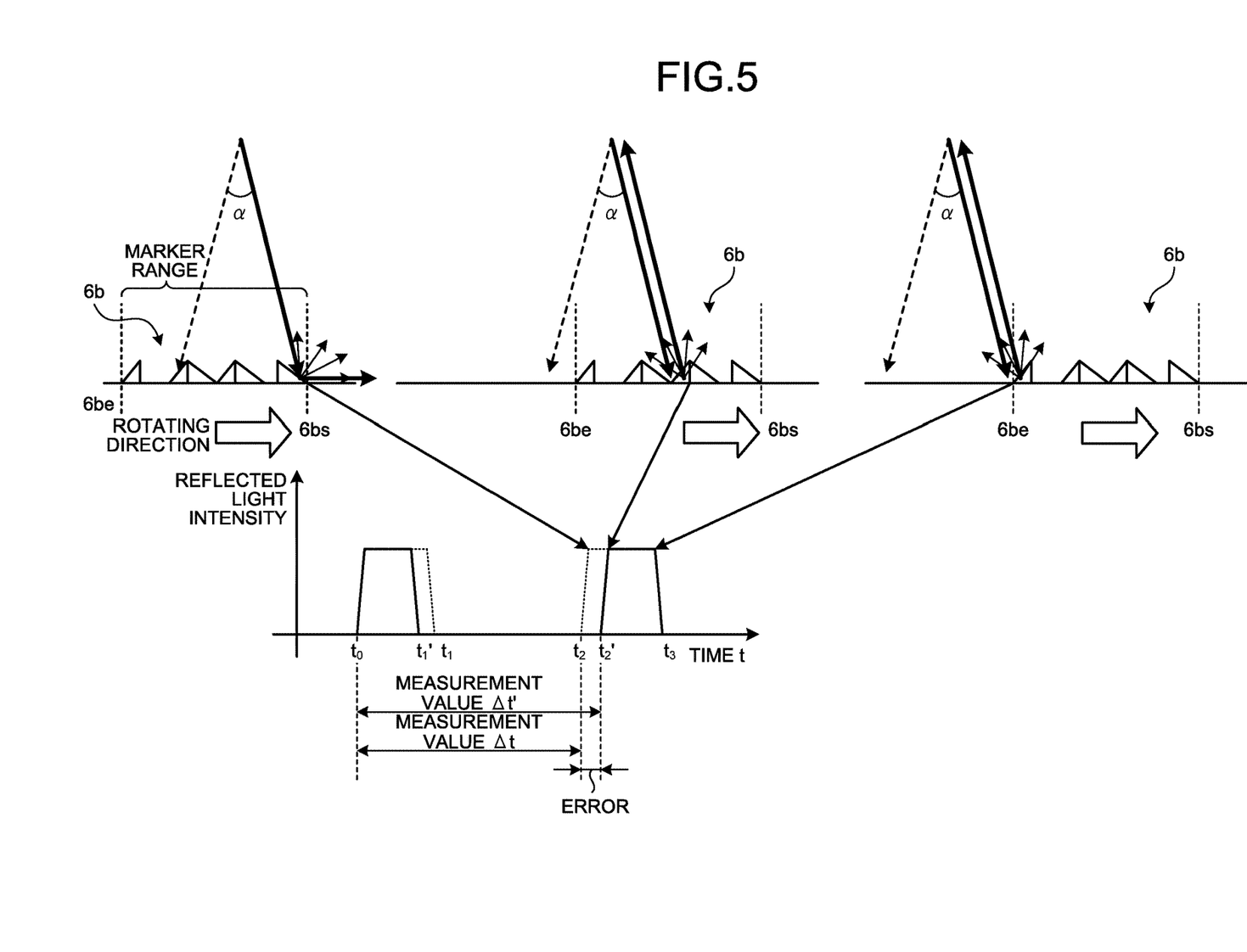
FIG. 5 is a diagram for describing a state in which the surface shape of the marker affects reflected light.

In this manner, by providing the marker 6b to the outer peripheral surface 6a of the turbine blade 6 and detecting the marker 6b, the time Δt from the detection of the first marker 6b to the detection of the next marker 6b can be acquired and the clearance d can be calculated based on the time Δt. Thus, the accurate calculation of the clearance d requires the accurate detection of the time Δt. Diligent studies by the inventors of the present invention found that light emitted from an optical fiber (point light source) may be affected by specular reflection on roughness of the surface of the marker 6b to fail in capturing the position of the marker 6b accurately, and the time Δt may include an error. FIG. 4 and FIG. 5 are diagrams for describing states in which the surface shape of the marker affects reflected light.

In the examples illustrated in FIG. 4 and FIG. 5, the optical axes of a pair of light transmission fibers and a pair of light reception fibers are disposed so as to intersect at an angle α, and light (laser light beam) emitted from one light transmission fiber is reflected by a marker 6b and received through the light reception fibers. As illustrated in FIG. 4, when light is emitted to a front end 6bs of the marker 6b, the light is reflected by the marker 6b and received by the light reception fibers. Thus, at a time t0, reflected light intensity (signal intensity in FIG. 3) is large. Roughness is formed on the surface of the marker 6b, and hence when light having high directivity such as a laser light beam is emitted to the marker 6b from one direction, the emitted light is specularly reflected by the roughness on the surface. Thus, the reflected light intensity may abruptly change even within the range of the marker 6b, a rear end 6be of the marker 6b may be detected at a time t1' in the middle of the marker 6b rather than at an intended time t1.

Similarly, as illustrated in FIG. 5, when light is emitted from the other light transmission fiber, the light is not specularly reflected by the front end 6bs and cannot be received by the light reception fibers depending on the shape of the marker 6b. Thus, the front end 6bs of the marker 6b may be detected at a time t2' in the middle of the marker 6b rather than at an intended time t2. In this manner, the configuration in which light having high directivity such as a laser light beam is emitted from one direction may cause a situation that a time is erroneously detected due to the roughness on the surface of the marker 6b, and a time Δt as a measurement value may become a time Δt' longer than an intended time and have an error. In view of such a problem, the inventors of the present invention conceived the optical sensor 11 capable of suppressing specular reflection on the surface of the marker 6b and detecting the time Δt accurately.

Figure 6:
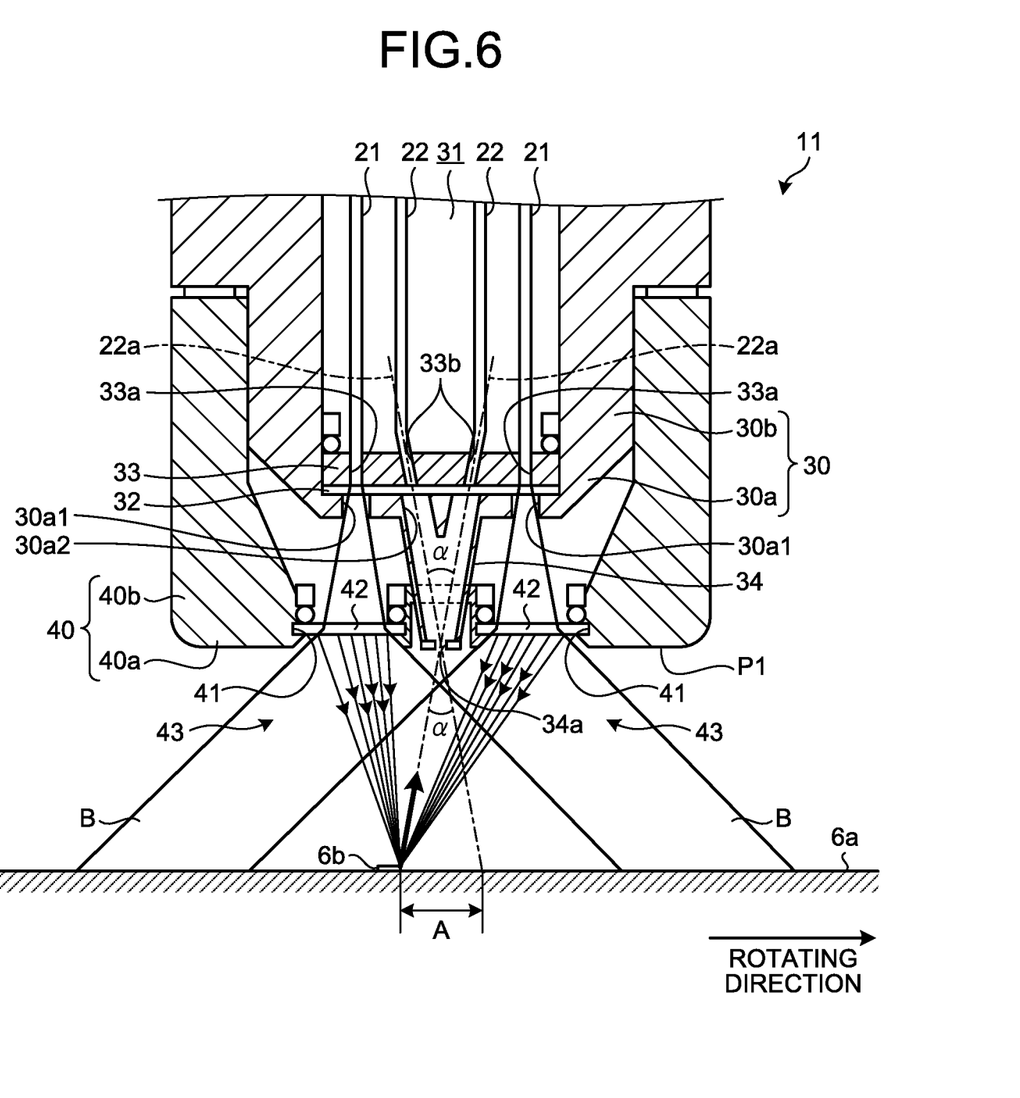
FIG. 6 is a partial cross-sectional view illustrating a state in which the optical sensor emits light to an outer peripheral surface.
Figure 7:
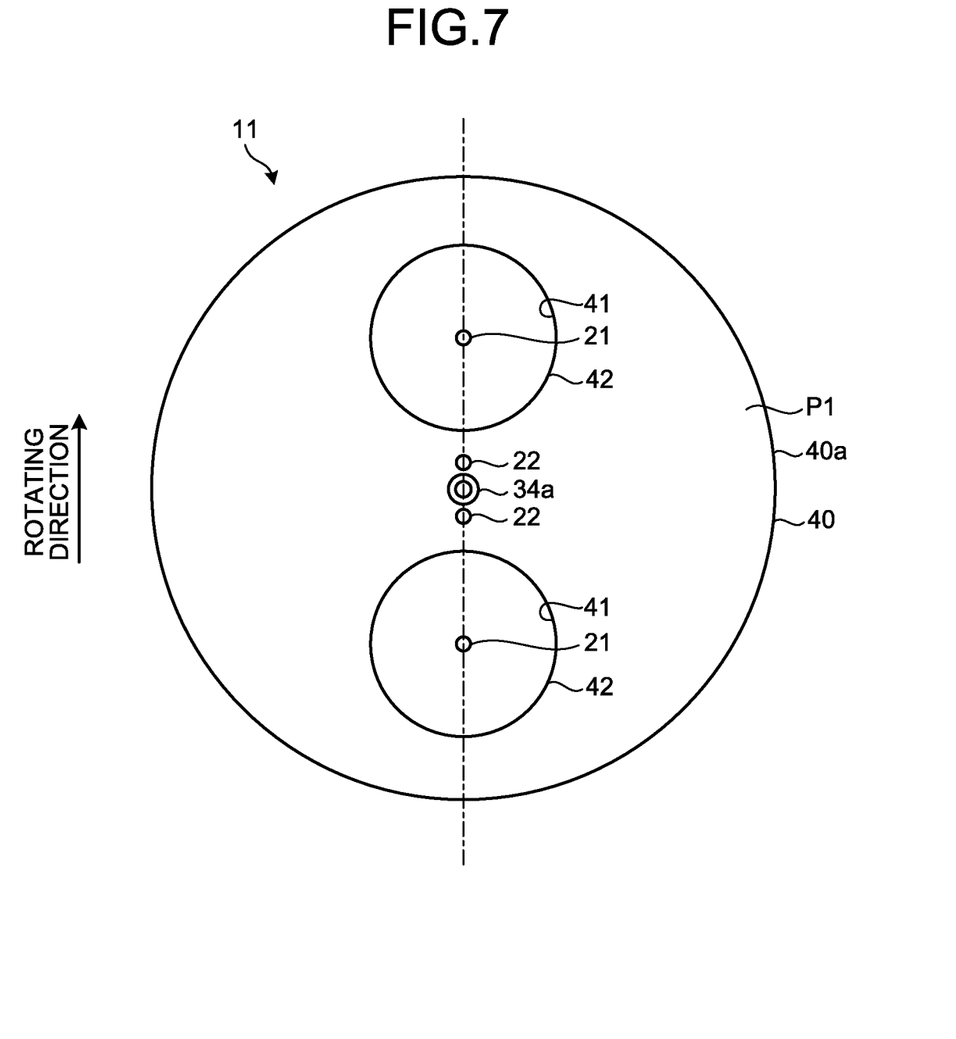
FIG. 7 is a plan view illustrating a detection surface of the optical sensor.

Next, the optical sensor 11 is described. FIG. 6 is a partial cross-sectional view illustrating a state in which the optical sensor emits light to the outer peripheral surface. FIG. 7 is a plan view illustrating the detection surface of the optical sensor. As illustrated in FIG. 6, the optical sensor 11 includes a sensor main body 30 and a head cover 40 having the detection surface P1 and mounted to the sensor main body 30. The sensor main body 30 has a bottomed cylindrical shape having a bottom plate portion 30a and a cylindrical portion 30b, and an internal space 31 is formed inside the sensor main body 30. In the internal space 31, a pair of light transmission fibers 21 and a pair of light reception fibers 22 are housed. The pair of light reception fibers 22 are disposed in the internal space 31 on the center side, and the pair of light transmission fibers 21 are disposed in the internal space 31 on the side-wall side across the light reception fibers 22. As illustrated in FIG. 7, the light transmission fibers 21 and the light reception fibers 22 are disposed along the rotating direction of the turbine blades 6 (FIG. 1).

In the internal space 31, as illustrated in FIG. 6, a transparent member 32 such as heat-resistant glass and a fiber holding member 33 laminated on the transparent member 32 are disposed on the bottom plate portion 30a. In the fiber holding member 33, light transmission through holes 33a and light reception through holes 33b are formed, and the light transmission fibers 21 and the light reception fibers 22 are inserted to the light transmission through holes 33a and the light reception through holes 33b, respectively. The bottom plate portion 30a of the sensor main body 30 is provided with light transmission window portions 30a1 that is connected to the light transmission through holes 33a through the transparent member 32 and light reception window portions 30a2 that is connected to the light reception through holes 33b through the transparent member 32. In this configuration, the transparent member 32 and the fiber holding member 33 are sealed to be highly resistant to pressure and held. Thus, even when the outside environments are high-temperature and high-pressure environments, the internal space 31 in which the light transmission fibers 21 and the light reception fibers 22 are disposed can be maintained to be atmosphere pressure environments, and a change in the light transmission fibers 21 and the light reception fibers 22 caused by the outside environments can be suppressed so that the detection accuracy is not decreased. Note that the internal space 31 is interrupted from the outside environments and hence cooled air may be additionally circulated and introduced to the internal space 31.

The light reception through holes 33b and 33b are formed such that optical axes 22a and 22a of the inserted pair of light reception fibers 22 and 22 intersect at the above-mentioned angle α. A conical covers 34 forming a light guide path for guiding light to the light reception fibers 22 and 22 is provided around the light reception window portions 30a2 and 30a2, and a light reception opening 34a for taking light into the conical cover 34 is provided to the bottom portion of the conical cover 34. Thus, light from other than the light reception opening 34a can be prevented from entering the conical cover 34. Furthermore, the optical axes 22a and 22a of the light reception fibers 22 and 22 intersect on the inner side of the light reception opening 34a. In this manner, the opening area of the light reception opening 34a can be reduced. The optical axes 22a and 22a of the light reception fibers 22 and 22 spread into the above-mentioned rotation by the light reception opening 34a and come into contact with the outer peripheral surface 6a of the turbine blade 6 (FIG. 1). Thus, in this configuration, a measurement region A sectioned by the optical axes 22a and 22a is formed on the outer peripheral surface 6a along the rotating direction.

On the other hand, as illustrated in FIG. 6, the head cover 40 is formed into a bottomed cylindrical shape having a bottom plate portion 40a and a cylindrical portion 40b, and mounted to the cylindrical portion 30b of the sensor main body 30. The bottom surface of the bottom plate portion 40a is the detection surface P1, and as illustrated in FIG. 7, openings 41 concentric with the light transmission fibers 21 are formed in the bottom plate portion 40a, and fluorescent plates 42 are mounted to the openings 41. The fluorescent plate 42 is a plate member formed by including fluorescent material that emits fluorescence when irradiated with excitation light having a predetermined wavelength. In this configuration, excitation light emitted from the light emitting unit 12 is emitted to the fluorescent plate 42 through the light transmission fiber 21. The fluorescent plate 42 absorbs the excitation light and emits fluorescence from the entire surface of the fluorescent plate 42. Thus, as illustrated in FIG. 6, the fluorescence emitted from the fluorescent plates 42 forms irradiation regions B and B widely spread, and the irradiation regions B and B are each formed to overlap with the measurement region A. In the first embodiment, the light transmission fibers 21 and the fluorescent plate 42 constitute a planar light source 43.

Figure 8:
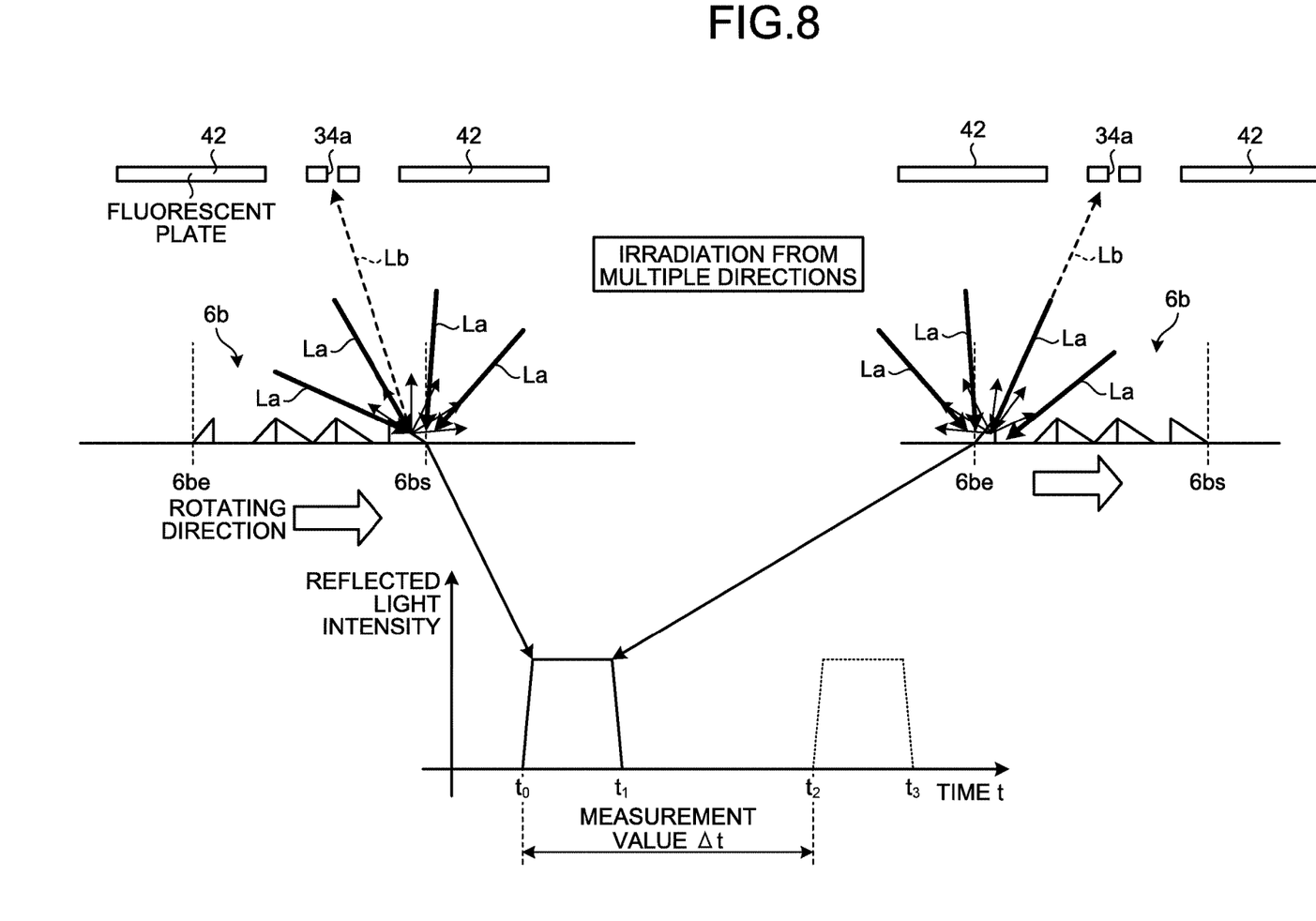
FIG. 8 is a diagram for describing a state in which light emitted from the optical sensor is reflected.

With this configuration, as illustrated in FIG. 8, light La emitted from the fluorescent plate 42 is spread in multiple directions and emitted to the marker 6b. Thus, a variation in light distribution characteristics can be reduced, and light La in any direction emitted to the marker 6b within the above-mentioned measurement region A (FIG. 6) is reliably reflected by the front end 6bs and the rear end 6be of the marker 6b and reflected light Lb enters the light reception opening 34a. Thus, a time Δt as a measurement value can be accurately measured. In particular, the fluorescence has a wavelength different from the excitation light, and the light receiving unit 13 has a filter (not shown) configured to block the wavelength of excitation light and transmit the wavelength of fluorescence, and hence a malfunction caused by reception of the excitation light can be prevented.

Figure 9:
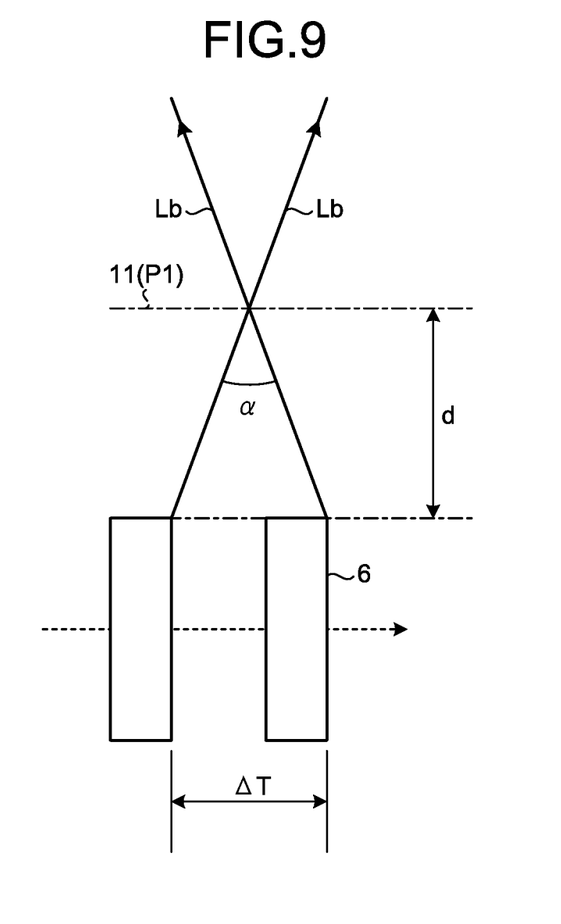
FIG. 9 is a diagram illustrating a relation between an angle formed by reflected light in the optical sensor and a clearance.

In the first embodiment, the relation between the angle α of the reflected light beams Lb and Lb and the clearance d is as illustrated in FIG. 9. Thus, after the measurement controller 14 acquires a time ΔT based on a light reception signal, the measurement controller 14 can accurately measure the clearance d based on a calculation formula expressed by the following Equation (2). The measurement controller 14 outputs the measured clearance d to the turbine controller 8. Note that "2πR/T" in Equation (2) is a peripheral velocity of the turbine blades 6 on the outer circumference similarly to the above Equation (1). The time "ΔT" in Equation (2) corresponds to the time "Δt" in Equation (1).

$$d = \frac{\frac{1}{2} \times 2\pi R \times \frac{\Delta T}{T}}{\tan\frac{\alpha}{2}} \quad (2)$$

As described above, according to the first embodiment, light is emitted from each planar light source 43 to the measurement region A, and hence a variation in light distribution characteristics can be reduced, and specular reflection on the surface of the marker 6b passing through the measurement region A can be suppressed to measure the clearance d accurately. Furthermore, the optical sensor 11 has the light reception opening 34a between the planar light sources 43 and 43, and the optical axes 22a and 22a of the light reception fibers 22 intersect on the inner side of the light reception opening 34a, and hence a gap of the light reception fibers 22 and 22 can be reduced to reduce an error caused by thermal elongation of the light reception fibers 22 and 22.

The planar light source 43 includes the light transmission fiber 21 configured to emit excitation light having a predetermined wavelength and the fluorescent plate 42 configured to emit fluorescence from excitation light emitted from the light transmission fiber 21, and hence is capable of emitting fluorescence from the entire surface of the fluorescent plate 42 to emit light to the measurement region A easily.

In addition, the light receiving unit 13 includes the filter (not shown) configured to block the wavelength of excitation light and transmit the wavelength of fluorescence, and hence is capable of preventing a malfunction caused by reception of the excitation light.

Second Embodiment

Figure 10:
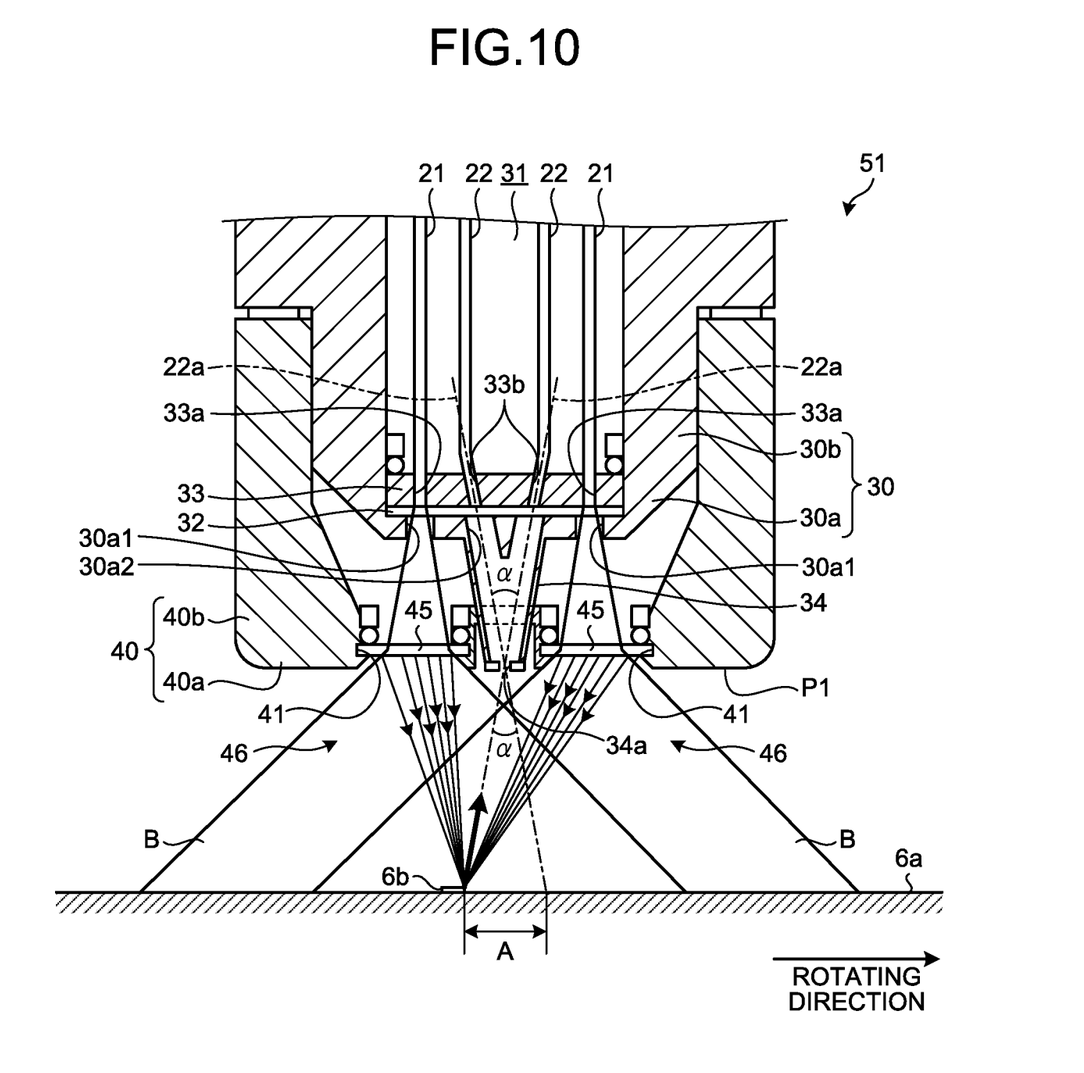
FIG. 10 is a partial cross-sectional view illustrating a state in which an optical sensor according to a second embodiment emits light to an outer peripheral surface.
Figure 11:
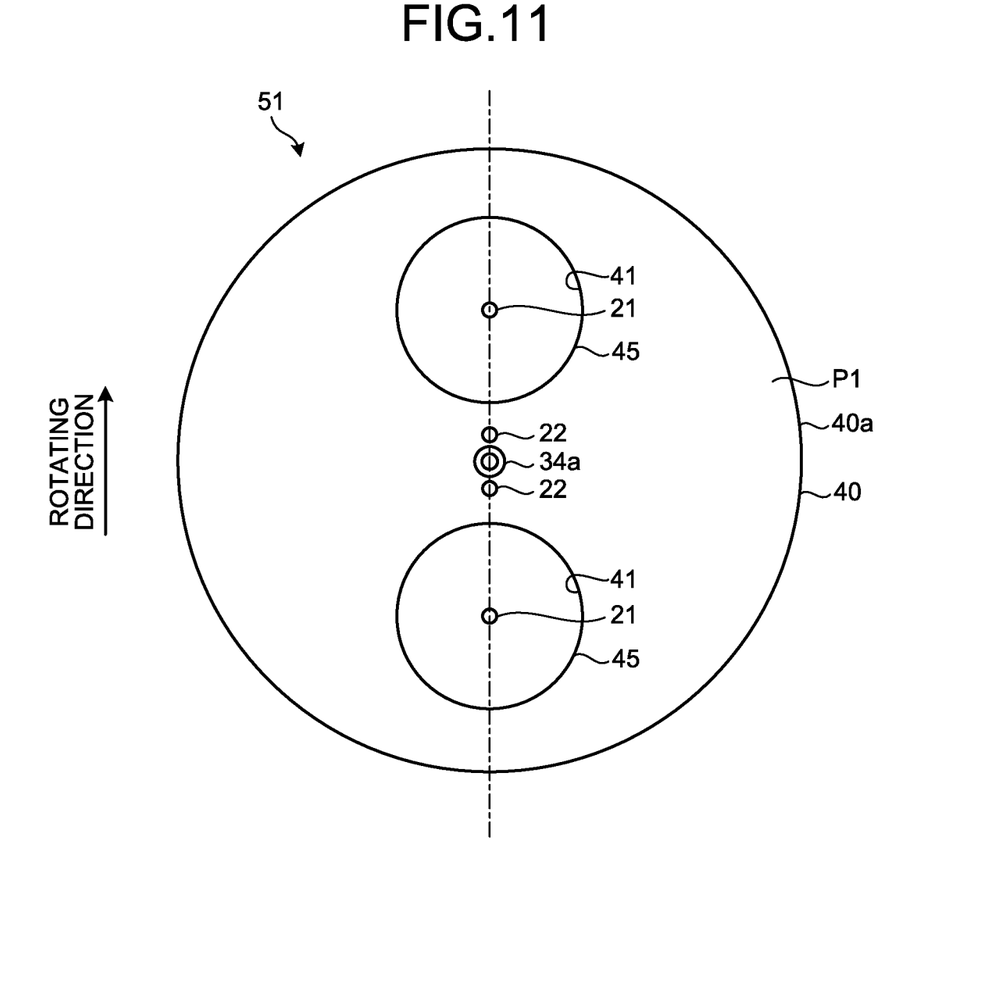
FIG. 11 is a plan view illustrating a detection surface of the optical sensor.

FIG. 10 is a partial cross-sectional view illustrating a state in which an optical sensor according to a second embodiment emits light to an outer peripheral surface. FIG. 11 is a plan view illustrating a detection surface of the optical sensor. In the above-mentioned embodiment, the optical sensor 11 including the planar light source 43 having the light transmission fibers 21 and the fluorescent plate 42 has been described, but in the second embodiment, the configuration of the planar light source is different. The same configurations as in the first embodiment are denoted by the same reference symbols, and descriptions thereof are omitted.

As illustrated in FIG. 10 and FIG. 11, the optical sensor 51 includes a planar light source 46, and the planar light source 46 includes light transmission fibers 21 and a scattering plate 45. For example, the scattering plate 45 has a diffusion layer formed by using sands having a particular particle diameter on the surface of a plate member having translucency such as heat-resistant glass. In this configuration, the direction of light when passing is randomly reflected to diffuse the light, and hence it is unnecessary to convert the wavelength of light and the device configuration is simple.

Also in the second embodiment, light is emitted from each planar light source 46 toward the measurement region A, and hence a variation in light distribution characteristics can be reduced, and specular reflection on the surface of the marker 6b passing through the measurement region A can be suppressed to measure the clearance d accurately. The planar light source 46 includes the light transmission fibers 21 configured to emit light and the scattering plate 45 configured to scatter the light emitted from the light transmission fiber, and hence is capable of diffusing light with a simple configuration to emit light to the measurement region A easily.

Third Embodiment

Figure 12:
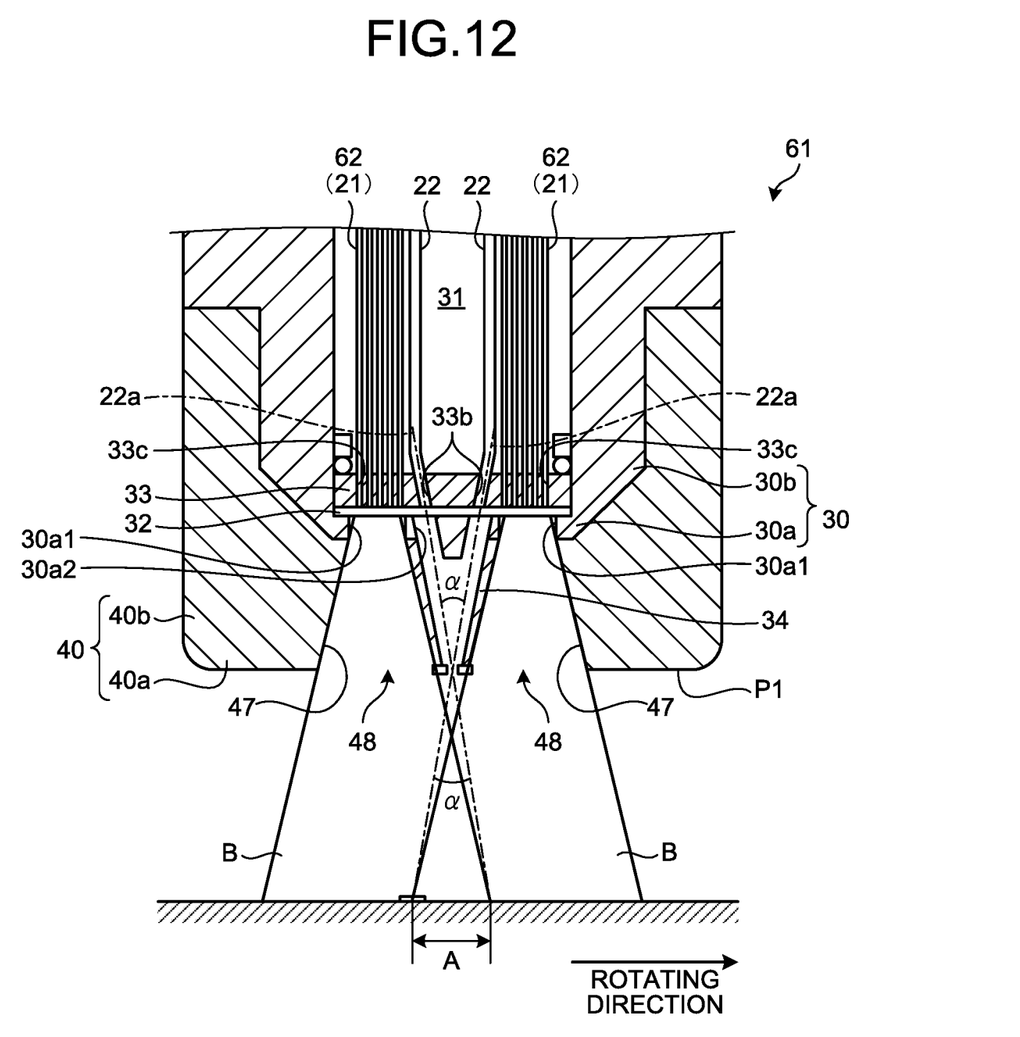
FIG. 12 is a partial cross-sectional view illustrating a state in which an optical sensor according to a third embodiment emits light to an outer peripheral surface.
Figure 13:
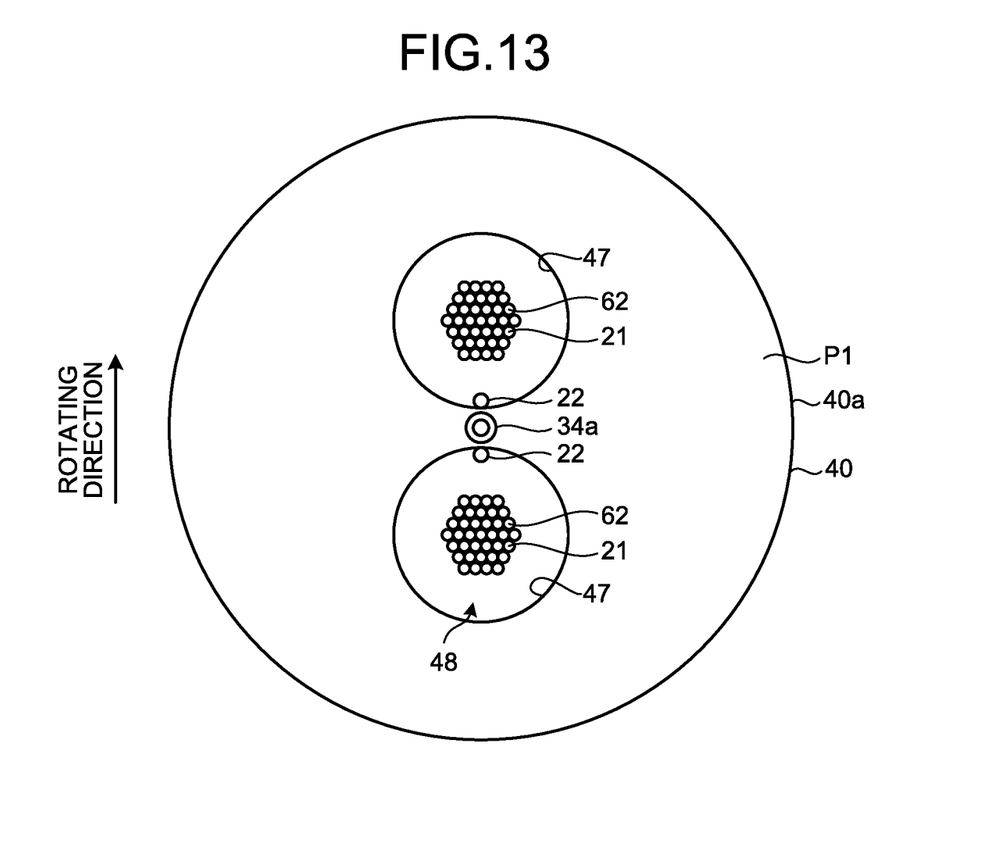
FIG. 13 is a plan view illustrating a detection surface of the optical sensor.

FIG. 12 is a partial cross-sectional view illustrating a state in which an optical sensor according to a third embodiment emits light to the outer peripheral surface. FIG. 13 is a plan view illustrating a detection surface of the optical sensor. In the above-mentioned embodiment, the optical sensor 11 including the planar light source 43 having the light transmission fibers 21 and the fluorescent plate 42 has been described, but in the third embodiment, the configuration of the planar light source is different. The same configurations as in the first embodiment are denoted by the same reference symbols, and descriptions thereof are omitted.

As illustrated in FIG. 12 and FIG. 13, an optical sensor 61 includes a planar light source 48, and the planar light source 48 includes a light transmission fiber group 62 formed by bundling a large number of (20 to 40) light transmission fibers 21. In the third embodiment, a through hole 33c to which the light transmission fiber group 62 is inserted is formed in the fiber holding member 33. Laser light beams emitted from the light transmission fibers 21 have high directivity, but the light transmission area is increased by bundling the light transmission fibers 21, and hence the optical sensor 61 can function as a planar light source to diffuse the light.

A light guide opening 47 whose diameter gradually increases is provided to the bottom plate portion 40a of the head cover 40 such that light is diffused. Also in the third embodiment, light is emitted from each planar light source 48 toward the measurement region A, and hence a variation in light distribution characteristics can be reduced, and specular reflection on the surface of the marker 6b passing through the measurement region A can be suppressed to measure the clearance d accurately. The planar light source 48 may be formed as a light transmission fiber group in which a plurality of light transmission fibers 21 configured to emit light are bundled. With this configuration, the irradiation area of light emitted from the light transmission fiber group 62 can be increased to emit light to the measurement region A easily.

While one embodiment of the present invention has been described, the embodiment is presented as an example and is not intended to limit the scope of the invention. For example, in the above-mentioned embodiments, a clearance between the casing 5 and the turbine blade 6 of the turbine 3 has been described as a target for which the clearance d is measured, but is not limited to a turbine as long as it is a configuration in which a rotating member rotates in a casing.

REFERENCE SIGNS LIST

1 Clearance control system
3 Turbine
5 Casing
5a Inner peripheral surface
6 Turbine blade (rotating member)
6a Outer peripheral surface
6b Marker
6be Rear end
6bs Front end
8 Turbine controller
10 Clearance measurement device
11, 51, 61 Optical sensor
12 Light emitting unit
13 Light receiving unit
14 Measurement controller
21 Light transmission fiber
22 Light reception fiber
22a Optical axis
30 Sensor main body
34a Light reception opening
40 Head cover
42 Fluorescent plate
43, 46, 48 Planar light source
45 Scattering plate
62 Light transmission fiber group
A Measurement region
B Irradiation region
d Clearance
Δt Time

The invention claimed is:

1. A clearance measurement device for measuring a clearance between an inner peripheral surface of a casing having a cylindrical shape and an outer peripheral surface of a rotating member configured to rotate in the casing, the clearance measurement device comprising:
   a marker provided to the outer peripheral surface of the rotating member;
   an optical sensor attached to the casing, and configured to emit light toward the outer peripheral surface of the rotating member, receive light reflected from the rotating member, and detect the marker based on a change in amount of the received reflected light; and
   a measurement controller configured to perform signal processing on a light emission signal output from the optical sensor and a light reception signal received by the optical sensor,
   wherein the optical sensor includes light reception fibers disposed such that optical axes intersect at a predetermined angle and having a measurement region on the outer peripheral surface, and planar light sources provided in a row along a rotating direction of the rotating member and each configured to emit light in a manner overlapping with the measurement region.

2. The clearance measurement device according to claim 1, wherein the optical sensor has a light reception opening between the planar light sources, and the optical axes of the light reception fibers intersect on an inner side of the light reception opening.

3. The clearance measurement device according to claim 1, wherein the planar light sources each include a light transmission fiber configured to emit excitation light having a predetermined wavelength, and a fluorescent plate configured to emit fluorescence by the excitation light emitted from the light transmission fiber.

4. The clearance measurement device according to claim 3, further comprising a filter configured to block the excitation light and transmit the fluorescence.

5. The clearance measurement device according to claim 1, wherein the planar light sources each include a light transmission fiber configured to emit light, and a scattering plate configured to scatter the light emitted from the light transmission fiber.

6. The clearance measurement device according to claim 1, wherein the planar light sources are each formed by bundling light transmission fibers emitting light.

7. A clearance control system, comprising:
the clearance measurement device according to claim 1; and
a turbine controller configured to execute clearance adjustment control for adjusting the clearance based on the clearance measured by the clearance measurement device.

* * * * *